United States Patent [19]
Watkins et al.

[11] Patent Number: 5,529,102
[45] Date of Patent: Jun. 25, 1996

[54] MOTORCYCLE RADIAL TIRE WITH SUPPLEMENTARY BREAKER PLY

[75] Inventors: David R. Watkins; Nigel G. Nock, both of Sutton Coldfield; Michael Jackson, Yardley, all of England

[73] Assignee: Sumitomo Rubber Industries, Ltd., Hyogo-ken, Japan

[21] Appl. No.: 382,151

[22] Filed: Feb. 1, 1995

[30] Foreign Application Priority Data

Feb. 19, 1994 [GB] United Kingdom .................. 9430229
Feb. 19, 1994 [GB] United Kingdom .................. 9430230

[51] Int. Cl.⁶ .................. B60C 3/00; B60C 9/08; B60C 9/18; B60C 9/20
[52] U.S. Cl. .................. 152/454; 152/526; 152/534; 152/536
[58] Field of Search .................. 152/534–536, 152/526, 531, 454

[56] References Cited

U.S. PATENT DOCUMENTS

| | | |
|---|---|---|
| 3,656,533 | 4/1972 | Barassi et al. . |
| 4,776,378 | 10/1988 | Griffiths et al. . |
| 4,790,363 | 12/1988 | Ingley et al. . |
| 4,986,326 | 1/1991 | Watkins et al. . |
| 5,339,878 | 8/1994 | Takase .................. 152/534 X |

FOREIGN PATENT DOCUMENTS

| | | |
|---|---|---|
| 0189298 | 7/1986 | European Pat. Off. .............. 152/531 |
| 0456933 | 11/1991 | European Pat. Off. . |
| 0547849 | 3/1993 | European Pat. Off. . |
| 509174 | 6/1971 | Italy . |
| 973944 | 11/1964 | United Kingdom .................. 152/538 |
| 2157239 | 10/1985 | United Kingdom . |
| 2283215 | 5/1995 | United Kingdom . |

*Primary Examiner*—Adrienne C. Johnstone
*Attorney, Agent, or Firm*—Birch, Stewart, Kolasch & Birch

[57] ABSTRACT

A motorcycle radial tire comprises a tread reinforced between its edges by a breaker assembly and having in its normally inflated fitted condition a camber value C/L of between 0.5 and 0.7, a reinforcing carcass of radially disposed cords extending radially inside the breaker assembly and between two bead regions and wrapped in each bead region around an annular bead core from the axial inside to the outside to form carcass ply turn-ups, and tire sidewalls between the tread edges and bead regions, the tire characterized in that the breaker assembly comprises two breaker plies each reinforced with aromatic polyamide cords oppositely inclined with respect to the circumferential direction of the tire and a supplementary ply disposed radially adjacent to the breaker plies and reinforced with nylon reinforcements laid parallel to each other and disposed at an angle in the range of 75°–90° to the circumferential direction of the tire.

6 Claims, 2 Drawing Sheets

MOTORCYCLE RADIAL TIRE WITH SUPPLEMENTARY BREAKER PLY

BACKGROUND OF THE INVENTION

The present invention relates to radial motorcycle tires and more particularly but not exclusively to high performance tires, e.g. racing motorcycle tires.

Such tires utilize very wide treads which in transverse cross-section are sharply curved to provide good contact with the road surface when the motorcycle is steeply banked when cornering. Maintenance of a consistent ground contact area of the tire footprint' under all conditions is a major problem in determining general vehicle handling. Of particular importance in motorcycle racing tires of radial construction is the provision of high cornering power with good stability to maximize cornering speeds under race conditions.

Present radial motorcycle racing tires have short sidewalls which extend to the tread edges radially and axially outwardly from the tire beads. The beads provide engagement with the wheelrim on tapered bead seats. The sidewalls are reinforced by the radial carcass plies which, when tensioned by the inflation pressure, act together with sidewall geometry to provide location of the curved tread regions to withstand cornering forces.

The sharply curved tread region of the tire is specially reinforced by a reinforcing breaker to give the required structural rigidity to allow for banking over of the motorcycle when cornering while giving sufficient flexibility to allow localized tread flattening in the ground contact patch for good road grip.

SUMMARY OF THE INVENTION

An object of the present invention is to improve the properties of such tires.

According to one aspect of the present invention a radial motorcycle tire comprises a tread reinforced between its edges by a breaker assembly and having in its normally inflated fitted condition a camber value C/L of between 0.5 and 0.7, a reinforcing carcass of radially disposed cords extending radially inside the breaker assembly and between two bead regions and wrapped in each bead region around an annular bead core from the axial inside to the outside to form carcass turn-ups, and tire sidewalls between the tread edges and bead regions, the tire characterized in that the breaker assembly comprises two breaker plies each reinforced with aromatic polyamide cords laid parallel to each other and oppositely inclined to the circumferential direction with respect to the aromatic polyamide cords of the other breaker ply and a supplementary ply positioned radially adjacent to the breaker plies and reinforced with nylon reinforcements laid parallel to each other and disposed at an angle in the range of 75°–90° to the circumferential direction of the tire.

By camber value is meant the ratio C/L between the radial distance C from the center to the edge of the tire tread and the axial distance L between the center and edge of the tread.

Preferably the aromatic polyamide cords of the two breaker plies are inclined at between 16 and 30 degrees and most preferably they are inclined at 25 degrees to the circumferential direction of the tire.

The supplementary ply may be disposed radially inside or radially outside the two breaker plies and preferably the plies of the breaker assembly are arranged in order of increasing width in the direction of radial inside to the radial outside.

Motorcycle tires constructed according to the present invention have been found to have improved grip, cornering power and stability under all conditions.

BRIEF DESCRIPTION OF THE DRAWINGS

Further aspects of the present invention will become apparent from the description of the following embodiments in conjunction with the attached diagrammatic drawings in which.

DETAILED DESCRIPTION OF THE INVENTION

Figure 1:
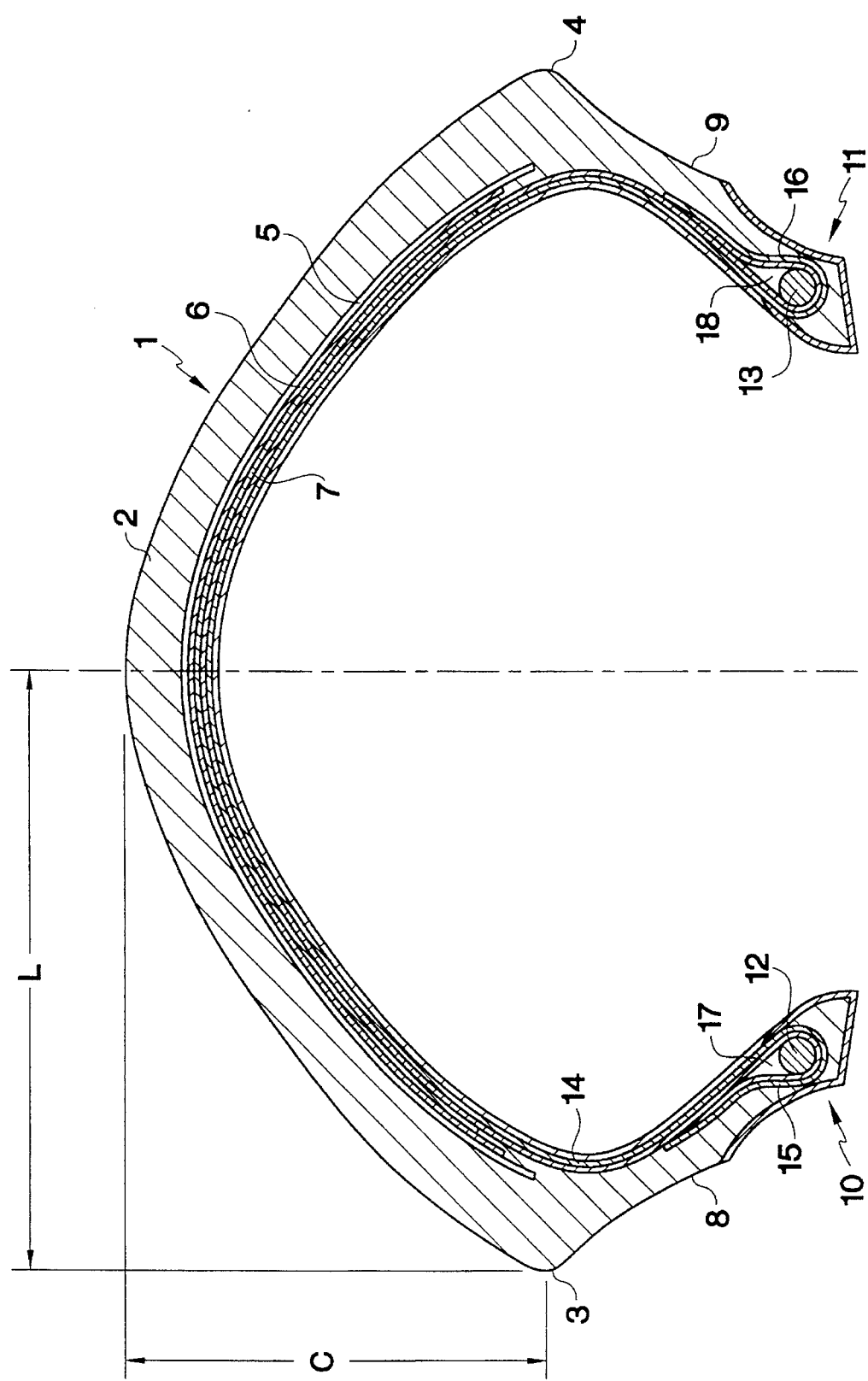
FIG. 1 shows in cross-section, as a first embodiment of the present invention, a 190/55 R17 radial motorcycle tire which is intended for high speed racing.
Figure 2:
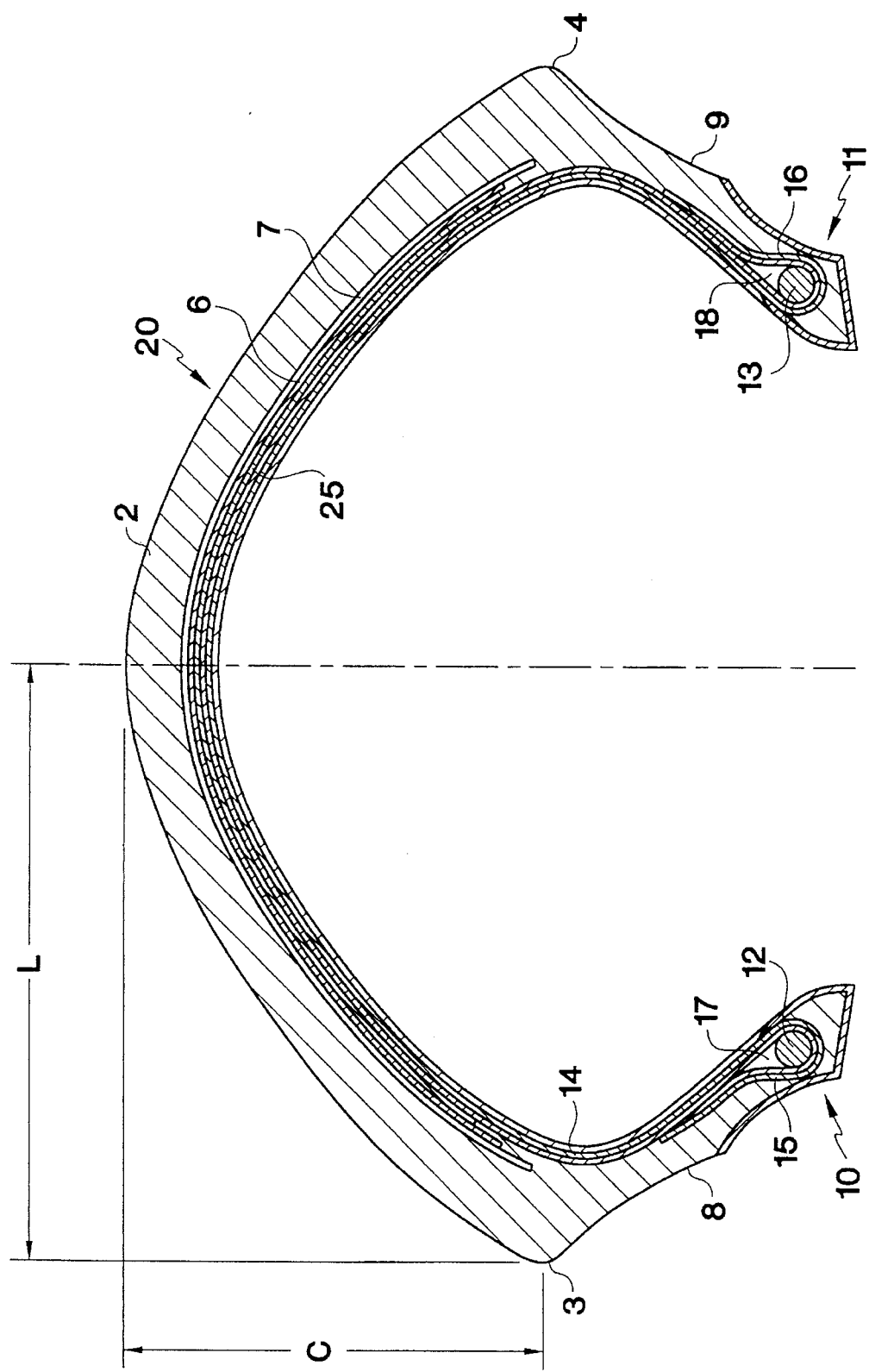
FIG. 2 shows in cross-section, as a second embodiment a 185/55 R17 radial motorcycle tire also intended for high speed use.

The tires 1 and 20 of FIGS. 1 and 2 respectively each include a pair of sidewalls 8 and 9 terminating in bead regions 10 and 11. Each bead region is reinforced by an inextensible annular bead core 12 and 13. Extending between each bead region is a tire carcass reinforcement 14 which is anchored in each bead region by being turned around the respective bead core 12,13 laterally from the inside to the outside to form a turn-up 15,16. The carcass reinforcement 14 comprises two plies of tire fabric comprising rubber covered nylon cords of 2/140 TEX laid with the cords substantially radially. While the present embodiment includes a carcass reinforcement of two plies, it may equally comprise a single carcass ply or multiple carcass plies. Each bead region 10,11 further comprises a hard rubber apex member 17,18 which is anchored to each respective bead core 12,13 and extends taperingly, radially outwardly.

The tires have a camber value of 0.6 and include a convex tread region 2, having tread edges 3,4 reinforced by a breaker assembly. The breaker assembly comprises two breaker plies 6 and 7 each of which is reinforced with Kevlar (Registered Trade Mark) aramid cord tire fabric each of 2/165 TEX. The cords in each of the breaker plies 6 and 7 are laid parallel to each other and oppositely inclined at an angle of 25° to the circumferential direction of the tire with respect to the cords of the other breaker ply radially inner breaker ply 6 is narrower than the radially outer breaker ply 7.

In the first embodiment, the tire 1 shown in FIG. 1, radially outside and immediately adjacent to the two breaker plies 6 and 7 is an over-breaker ply 5 comprising rubber covered nylon cords of 2/94 TEX. The cords in the over-breaker ply 5 are laid at an angle of substantially 90° to the circumferential direction of the tire.

As shown in FIG. 1 the plies 5, 6 and 7 forming the breaker assembly are arranged in order of increasing width in the axial direction of the tire from the inside radially outwards. The radially outermost over-breaker ply 5 extends substantially to the tread edges.

In the second embodiment, the tire 20 shown in FIG. 2, has a sub-breaker ply 25 comprising rubber covered nylon cords of 2/140 TEX which is disposed radially inside and immediately adjacent to the two breaker plies 6 and 7. The cords in the sub-breaker ply 25 are laid at an angle of 80° to the circumferential direction of the tire and cross, i.e. are oppositely inclined to, the aromatic polyamide cords of the adjacent breaker ply 6.

Again, as in the first embodiment, the plies 25, 6 and 7 forming the breaker assembly of the tire 20 are arranged in order of increasing width in the axial direction of the tire from the inside radially outwards. The radially outer breaker ply 7 extends substantially to the tread edges.

The resultant tires according to the present invention have been found to have improved cornering power and stability under all conditions and improved grip. This construction has also been shown to give superior speed under race conditions.

Having now described our invention what we claim is:

1. A radial motorcycle tire comprising a tread reinforced between its edges by a breaker assembly and having in its normally inflated fitted condition a camber value C/L of between 0.5 and 0.7, wherein C/L is the ratio between the radial distance C from the center to the edge of the tire tread and the axial distance L between the center and edge of the tread, a reinforcing carcass of radially disposed cords extending radially inside the breaker assembly and between two bead regions and wrapped in each bead region around an annular bead core from the axial inside to the outside to form carcass turn-ups, and tire sidewalls between the tread edges and bead regions, wherein the breaker assembly comprises two breaker plies, each reinforced with aromatic polyamide cords laid parallel to each other and oppositely inclined to the circumferential direction with respect to the aromatic polyamide cords of the other breaker ply, said aromatic polyamide cords of the two breaker plies being inclined at 16 to 30 degrees to the circumferential direction of the tire and a supplementary ply disposed radially adjacent to the breaker plies and radially inside thereof and reinforced with nylon reinforcements laid parallel to each other and disposed at an angle in the range of 75°–90° to the circumferential direction of the tire.

2. The radial motorcycle tire according to claim 1, wherein the nylon reinforcements of the supplementary ply are cords.

3. The radial motorcycle tire according to claim 1, wherein the aromatic polyamide cords of the two breaker plies are inclined at 25° to the circumferential direction of the tire.

4. The radial motorcycle tire according to claim 1, wherein the radially outermost-breaker ply is wider than the adjacent radially inner breaker ply.

5. The radial motorcycle tire according to claim 1, wherein the plies of the breaker assembly are disposed in order of increasing width in the direction of the radial inside to the radial outside.

6. The radial motorcycle tire according to claim 1, wherein the nylon reinforcements of the supplementary ply are laid at an angle of 75° to 85° to the tire circumferential direction.

\* \* \* \* \*